United States Patent [19]

te Kolsté

[11] Patent Number: 4,483,071
[45] Date of Patent: Nov. 20, 1984

[54] SAW GUIDE FOR A POWER-DRIVEN CIRCULAR HAND SAW MACHINE OR A JIG SAW MACHINE

[75] Inventor: Jan W. te Kolsté, Wassenaar, Netherlands

[73] Assignee: Wulfson Beheer BV, Wassenaar, Netherlands; a part interest

[21] Appl. No.: 363,762

[22] Filed: Mar. 31, 1982

[30] Foreign Application Priority Data

Apr. 2, 1981 [NL] Netherlands .......................... 8101646

[51] Int. Cl.³ ............................................. B23D 47/02
[52] U.S. Cl. ....................................... 30/376; 30/388; 33/42
[58] Field of Search ................................. 30/371–376, 30/388, 282, 288, 310, 300; 33/41 R, 42, 27 C, 468, 469; 83/767

[56] References Cited

U.S. PATENT DOCUMENTS

| | | | |
|---|---|---|---|
| 1,535,042 | 4/1925 | Sadler | 83/767 X |
| 3,146,675 | 9/1964 | Anderson | 30/31 D X |
| 3,974,565 | 8/1976 | Ellis | 30/376 |
| 4,016,649 | 4/1977 | Kloster | 30/373 |
| 4,128,940 | 12/1978 | Ong | 30/388 X |

Primary Examiner—E. R. Kazenske
Assistant Examiner—Douglas D. Watts
Attorney, Agent, or Firm—H. Mathews Garland

[57] ABSTRACT

Saw guide for a power-driven circular hand saw machine or jig saw machine having a base plate (1), a saw blade (4) extending through the base plate (1), a driving motor (2) and a handle (6) with operating switch (7) for the driving motor (2), which saw guide consists of a bar member (13) provided with a graduation and attachable to the base plate (1) of the machine perpendicular to the base plate (1) and of a gauge member (14, 33), which gauge member (14, 33) is shiftable along and fixable on the bar member (13) by means of a sliding member (15), which is provided with one or more indicators (17–21) for the graduation on the bar member (13), which bar member (13) is adapted in use with one end (13a) to be fixed to the base plate (1), whereby means are present for compensating a possible deviation between saw blade (4) and longitudinal axis of the base plate (1), which means can be present either at the connection between the end of the bar member (13) to the base plate (1) and/or the gauge member (14).

11 Claims, 8 Drawing Figures

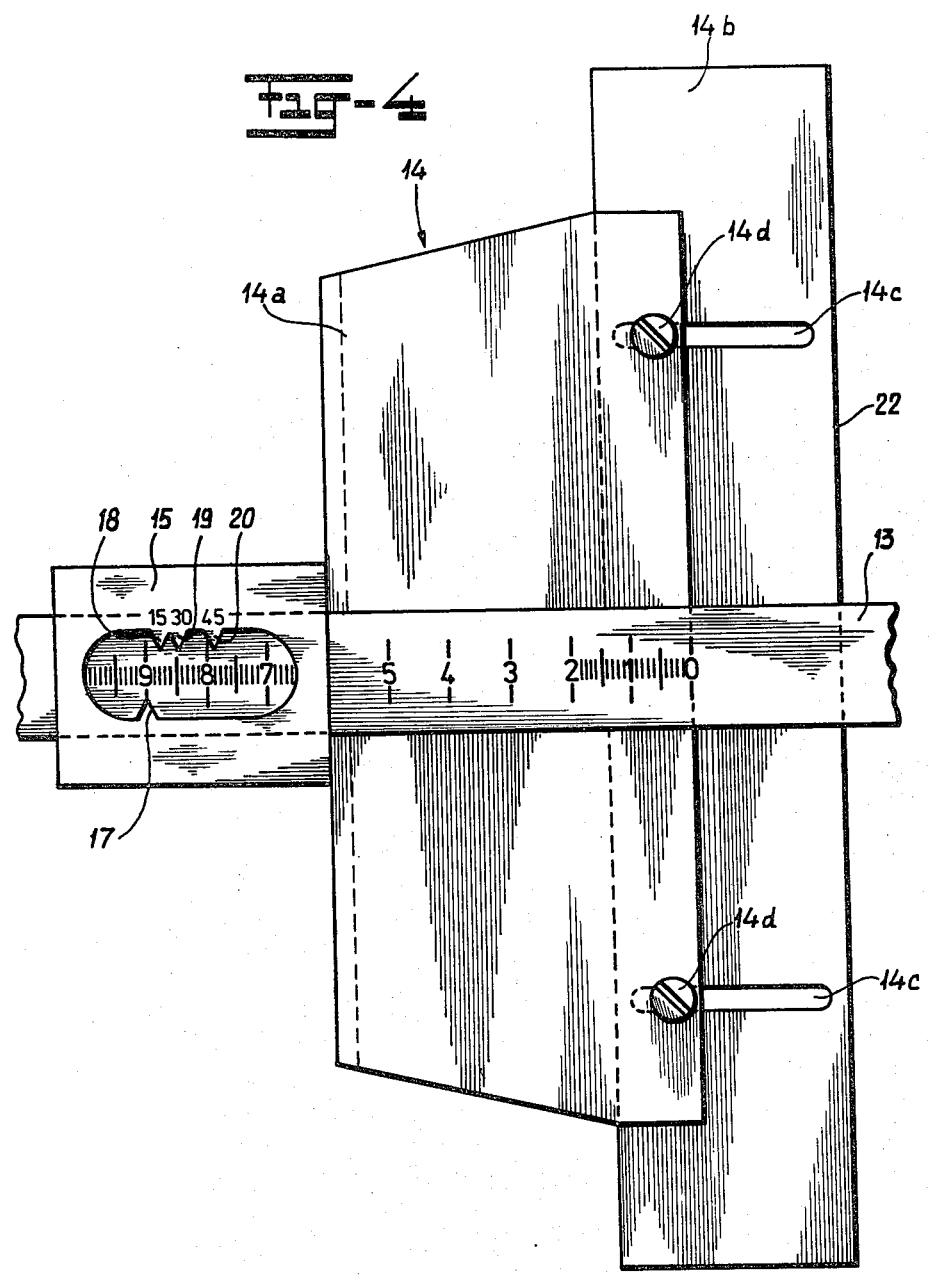

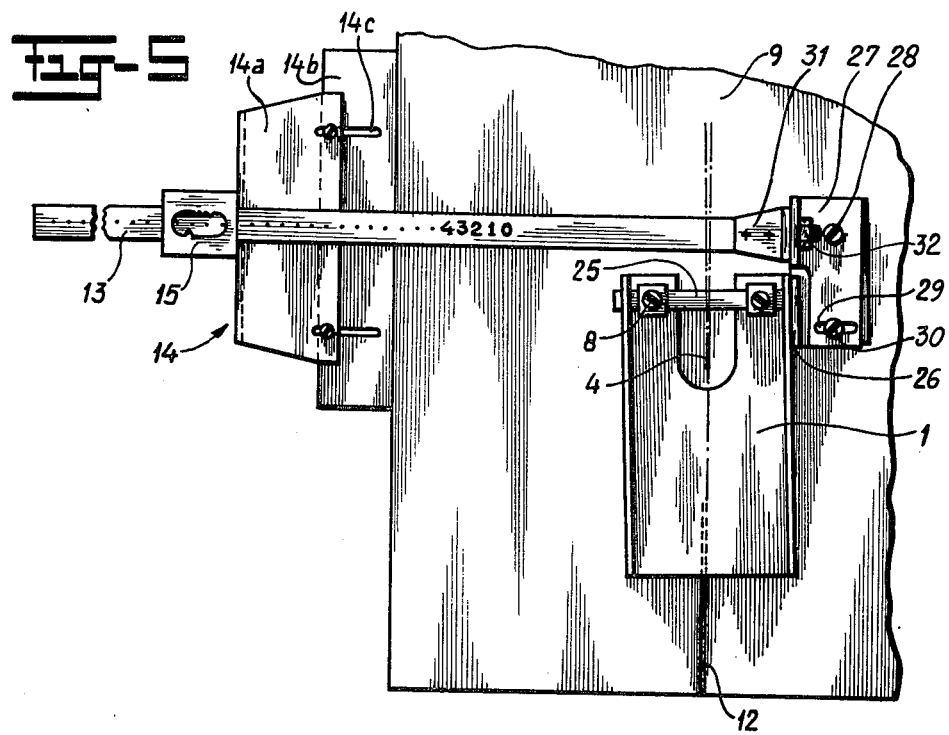
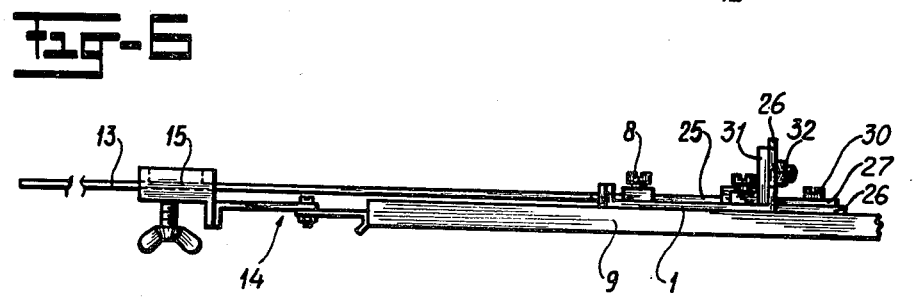

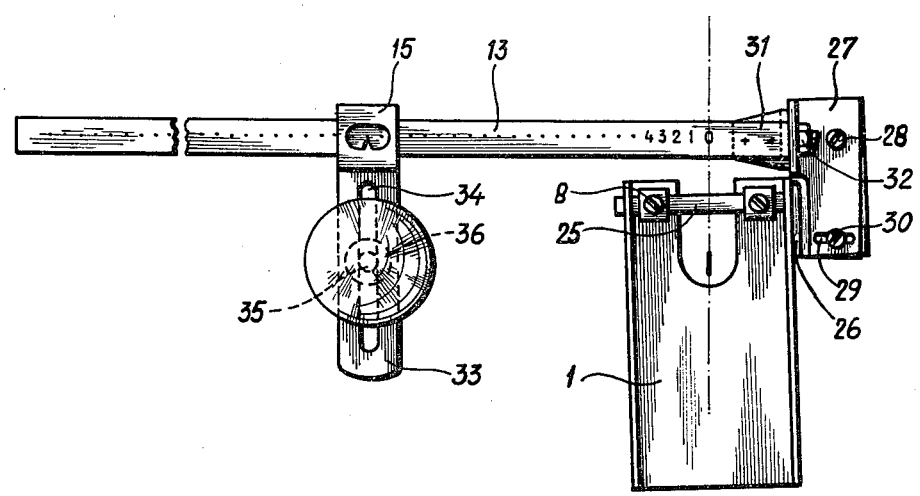
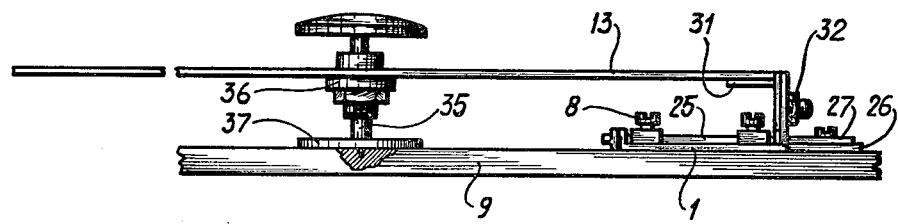

SAW GUIDE FOR A POWER-DRIVEN CIRCULAR HAND SAW MACHINE OR A JIG SAW MACHINE

The present invention relates to a saw guide for a power-driven circular hand saw machine or jig saw machine having a base plate, with which the machine is resting upon and is moving over the panel or board to be cut, a saw blade extending through the base plate, a driving motor and a handle with operating switch for the driving motor, which saw guide consists of a bar member provided with a graduation and attachable to the base plate of the machine perpendicular to the base plate and of a gauge member, which during sawing serves as guide for the saw blade.

Such a saw guide is known from German "Offenlegungsschrift" No. 2.919.611. The gauge member of this known guide is fixed to one end of the bar member, which is slidably connected to the base plate of the machine.

All T-shaped saw guides available on the market are designed in this way. During sawing the gauging edge of the gauge member is lying against the right side of the panel or board to be sawn.

When sawing the user must walk along the left hand side of the panel in order to be able to press downwards the machine with the right hand, simultaneously move it forward and press down the operating switch for the motor.

When sawing a long and wide board this is impossible and the user must walk along the right hand side of the board. In that case he is forced to operate the saw machine with the left hand. This is very difficult and is causing often an oscilating saw cut, because the saw machine and the saw guide cannot be controlled sufficiently.

Of course, it is possible to connect the T-shaped guide to the base plate at the left side of the saw blade, but in that case the possibilities for use are very limited. In the first place the middle edge has only a limited length, which means that one can only saw boards with a limited width. Obviously, in that case one could measure the portion to be sawn from the left side of the panel. However, this has the objection that one cannot saw a narrow lath, because the cross leg of the T-shaped guide cannot reach the circular saw blade, which is situated at the right hand of the motor and thus also at the right side of the base plate.

Apparently, the inventor of U.S. Pat. No. 3,927,475 has recognized also these problems and has tried to find a solution for them, in which he succeeded only in a very limited way. According to said U.S. Patent Specification a T-shaped guide with a long middle leg and a cross leg is used, which through an oblique brace is connected to the middle leg. The middle leg is adjustably connected to the base plate of the machine. A brace rod is still present, which with one end is pivotable to the connecting point between middle leg and cross leg and with the other end is pivotably and shiftably connected to the base plate. This brace rod, however, is not essential for operating the saw guide.

With this known saw machine it is possible to saw a portion from a wide and long panel, whereby one can press the cross leg with the left hand to the left side of the panel and can press down with the right hand the saw machine during the operation.

In this way the middle leg and also the brace rod project beyond the base plate at the right side and the more when the portion of the board to be sawn is wider, measured from the right side of the panel. These projecting parts can interfere with clamps or the like, which are used to fix the panel to be sawn.

For measuring the correct width of the board to be sawn a separate measuring staff must be used as is the case for all saw machines, available on the market.

One is also restricted with regards to the width of the board to be sawn because at a certain moment the oblique brace of the guide arrests the left side edge of the base plate, as shown in FIG. 2 with dotted lines.

The invention aims to provide a saw guide, missing the disadvantages of the known saw guides and which can be used for all circular saw machines and jig saw machines available on the market.

Practically all saw machines, certainly if it concerns jig saw machines show deviations of the saw blade, i.e. the saw blade is not exactly parallel to the longitudinal axis of the base plate. This means that if the bar member of the saw guide is exactly perpendicular to the longitundinal axis of the base plate this does not include that the member is perpendicular to the plane of the saw blade. If the saw guide is used now as parallel guide the saw blade is at a certain small angle to the aimed direction of sawing, so that there is some torsion and it is difficult to keep the machine under control. Especially for jig saw machines with very small saw blades seen in the direction of sawing this provides great problems.

If the jig saw machine is used for sawing a circular saw cut, for which purpose these machines are often offered and whereby the gauge member is provided with a sharp pin, serving as a centre for the circle by pressing the pin in the panel, then it appears to be very difficult to saw a correct circle, when the bar member is not exactly perpendicular to the saw blade.

Also for this problem the saw guide according to the invention offers a solution.

This is according to the invention obtained in that the gauge member is shiftable along and fixable on the bar member by means of a sliding member, which is provided with one or more indicators for the graduation on the bar member, in that the bar member is adapted in use with one end to be fixed to the base plate and in that means are present for compensating a possible deviation between saw blade and longitudinal axis of the base plate, which means can be present either at the connection between the end of the bar member to the base plate and/or at the gauge member.

By shifting and fixing the gauge member with the relevant indicator at a certain point of the graduation on the bar member, the saw blade will come automatically at the desired distance from the left side of the panel.

Each possible deviation between saw blade and base plate can be compensated by said means.

The invention will be explained with reference to the drawing for a number of embodiments, in which.

Figure 2:
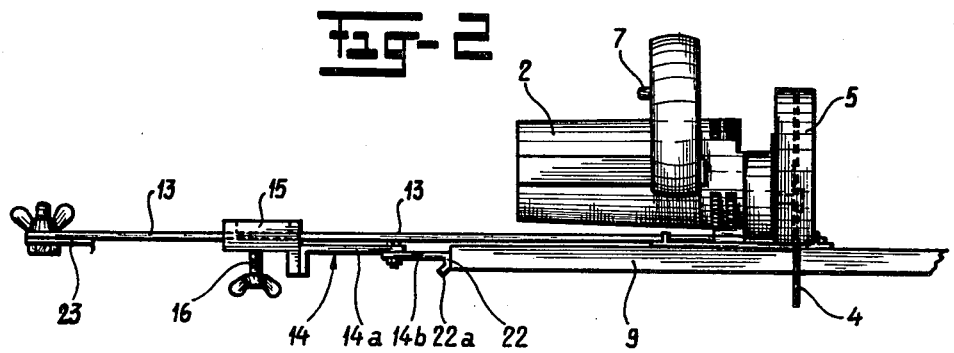
FIG. 2 is a back view of the apparatus according to FIG. 1.
Figure 3:
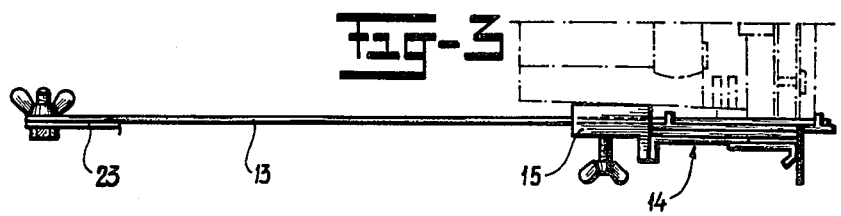

FIG. 3 corresponds partly to FIG. 2, whereby the guage member is shown in the outer right position;

FIG. 4 is a top view of the gauge member of the saw guide in which a part of the bar member with the graduation is shown;

FIG. 5 is a top view of a jig saw machine of which only the base plate is shown, provided with a saw guide for parallel guiding according to the invention;

FIG. 6 is a back view of FIG. 5;

FIG. 7 is a top view corresponding to FIG. 5, whereby the saw guide is used for making a circular saw cut; and FIG. 8 is a back view of FIG. 7.

Figure 1:
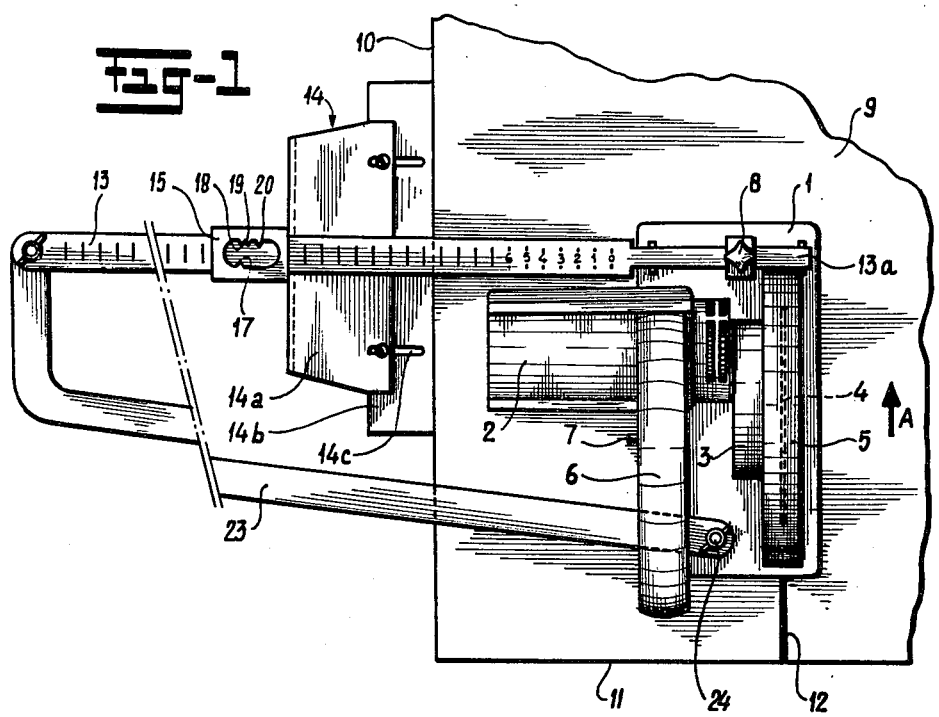
FIG. 1 is a top view of an usual power-driven circular hand saw machine, provided with a saw guide according to the invention.

A common circular saw machine shown in FIGS. 1, 2 and 3 consists of a rectangular base plate 1, a driving motor 2, a gear box 3, an exchangeable circular saw blade 4, a protecting hood 5, a handle 6 and an electric switch 7. On the base plate 1 a fixing screw 8 with a slide guide is shown for fixing the normal T-shaped saw guide. By means of this fixing screw 8 the middle leg of the normal T-shaped guide is movable with respect to the base plate 1 and is fixable thereon.

The panel to be sawn is indicated with 9. The left side of this panel 9 is indicated with 10. The normal direction of moving the saw machine is indicated with the arrow A in FIG. 1.

The front edge of the panel to be sawn is indicated with 11 and the saw cut already made with 12.

The saw guide according to the invention consists of a flat bar member 13 with at the one end a smaller part 13a, of which the width is adapted to the existing slide guide of the base plate 1. The bar 13 is provided with a graduation in centimeters with a subgraduation in millimeters, in a sequence which is opposite to that of a normal measuring staff, that means the zero-point is at the right side, see FIG. 1 and 4.

A guage member 14 is shiftable along the bar 13 and can be fixed thereon in each position. For this the gauge member 14 consists of a fixing part 14a and an adjustable part 14b. The fixing part 14a is provided with a sleeve-shaped sliding member 15, which by means of a clamp screw 16 can be fixed on the bar 13. In the upper side of the sleeve 15 a window is present with one or more indicators 17, 18, 19, 20. The meaning of these various indicators will be explained furtheron. Both parts 14a and 14b of the gauge member 14 are extending below the bar 13. The gauge member 14 extends on both sides of the bar 13 and its portion 14b is provided with a gauging edge 22, which is meant to be pressed against the left side 10 of the panel 9 during sawing.

The part 14b is further provided with two slots 134c by means of which the part 14b can be adjusted to the part 14a parallelly and angularly.

With 23 a brace is indicated, which can be used to fix the bar 13 in a better way with respect to the saw machine. This brace 23 is only required when one must saw a wide board portion, for instance more than 30 cm. This brace 23 is with one end connected to the left end of the bar 13 and is with the other end through a bolt 24 with counter sink head fixed to the lower side of the base plate 1 of the saw machine. This bolt 24 is normally not present at a saw machine and therefor must be provided additionally by the user. This brace 23, however, is not essential for operating the saw guide. The brace 23 contains a curve in order to enable that the gauge member 14 can be moved to the top end of the rod 13.

In contradiction to the known saw guides the right end of the bar 13 is fixed to the base plate by means of the fixing screw 8 or the like in a certain point. The graduation on the bar 13 is arranged in such a way that the figure which is present below the indicator 17 corresponds to the distance between the gauging edge 22 of the gauge member 14 and the saw blade 4. When fixing the saw guide to a certain saw machine the indicator 17 for instance is placed above the figure 40 cm of the graduation. The narrow part 13a of the bar 13 is then adjusted in the slide guide below the fixing screw 8 and shifted in such a way, until the distance between the saw blade 4 and the gauging edge 22 is also 40 cm. Then the fixing screw 8 is tightened and in use the bar 13 remains connected with the base plate 1 in this position. For a certain type of saw machine this adjustment has to be made only once. Of course, the correct fixing point for the screw 8 on the bar 13 must be maintained in a certain way, so that after removing the saw guide for storing, the correct place always can be found back. It is for instance possible to make a small hole in the smaller part 13a, in which the point of the fixing screw 8 fits. When a brace is used, an adjustment possibility must be available as a slot either at the left or right end of the brace 23.

When the saw guide according to the invention is sold together with a new saw machine, the bar 13 does not need have a smaller part 13a, as long as bar 13 can be connected to or disconnected from the base plate while the brace 23 does not need any adjustability.

Due to the fact that the part 14b can be adjusted parallelly or angularly to the part 14a by means of the slots 14c and fixing screws 14d, it is also possible to find an adaption for another saw machine, without finding the correct place for the connection of the bar 13 on the base plate 1 and without any adjustment possibility of the brace 23.

In FIG. 2 a back view of the saw machine with the saw guide according to the invention is shown.

In FIG. 3 the gauge member 14 of the saw guide is shown in the most right position, from which it appears that the gauge member 14 can be shifted completely below the base plate 1 of the saw machine. This means that it is possible to saw a very small lath, measured from the left side 10 of the plate 9.

In FIG. 4 at a larger scale a top view of the gauge member 14 with the sleeve 15 and a part of the bar 13 with thereon the graduation is shown. As mentioned already earlier in the window of the sleeve 15 different indications are numbered with 17, 18, 19 and 20. The indicator 17 serves for normal use, whereby the saw blade 4 is meant for vertical cutting. However, sometimes it is desired to mitre-saw. In that case the saw blade 4 is adjusted at a known way at a desired angle. Since mitre-sawing normally takes place at fixed angles, for instance 15°, 30° or 45°, in the window further indicators 18, 19 and 20 are available, which give the correct measure at mitre-sawing at 15°, resp. 30° resp. 45°. In order to make it possible to mitre-saw very closely against the gauging edge 22, the lower part of the edge 22 is bevelled, indicated with 22a in FIG. 2, 3 and 6.

The gauge member 14 extends on both sides of the bar 13 and has an essential width between the sleeve 15 and the gauging edge 22. The gauge member 14 is carried out rather massive and for this reason provides an excellent grip to the left hand of the user during sawing. During sawing the right hand of the user is controlling the handle 6 and the electric switch 7. The right hand presses the saw machine downward and forwards on the panel 9 and the left hand presses the gauging edge 22 against the left side 10 of the panel 9. In this way the saw machine is very carefully guided during sawing, by which a straight saw cut 12 is formed, also when the panel 9 has a large width and is long. During sawing one walks on the left side along the panel 9 with the saw machine. Pressing and operating takes place at a natural way with the right hand. Since most people are right-handed, this is the most natural position for them.

The bar 13 is preferably made of metal, for instance aluminium. If desired, the bar 13 may consist of several pieces, which can be connected to each other. This facilitates packaging the saw guide. The gauge member 14 can be made of one piece from plastic. The saw guide according to the invention can be manufactured for a low price, but forms a very useful supplement for a saw machine, for existing as well as for new machines.

Although in the foregoing always is spoken of a saw guide for a circular saw machine, the same considerations are applicable for a jig saw machine. But for a jig saw machine the saw guide has still more possibilities. For this reference is made to FIGS. 5, 6, 7 and 8.

In the FIGS. 5 and 6 the saw guide according to the invention is used as parallel guide for a jig saw machine, of which only the base plate 1 is shown.

It appears that most jig saw machines show deviations. This means that the saw blade 4 is not exactly parallel to the longitudinal axis of the base plate 1. In fact, this is also true for circular saw machines but owing to the large diameter of the circular saw blade this deviation has less influence.

If a circular saw machine has a deviation this can be compensated by adjusting angularly the part 14b with respect to the part 14a.

The same can be done for a jig saw machine, which is provided with means for fixing a normal saw guide for parallel guiding.

In that case the bar 13 is perpendicular to the longitudinal axis of the base plate 1 and the deviation is compensated by adjusting angularly the part 14b with respect to the part 14a of the gauge member 14.

However, for circular cutting it is a condition sine qua non that bar 13 is perpendicular to the saw blade 4. In that case auxiliary means must be provided in order to achieve a position for bar 13 as mentioned above.

In FIGS. 5, 6, 7 and 8 one example of such means are shown. Use is made of existing slide guides in the base plate of the jig saw machine. A rod 25 is clamped by means of the fixing screws 8. The right end of this rod 25 is fixed to a piece of angle metal 26.

The horizontal flange of this angle metal 26 is flush with the base plate 1.

On this horizontal flange a second angle metal 27 is fixed by means of a screw 28. This second angle metal 27 is provided with an arc-shaped slot 29, so that the angle metal 27 is angularly adjustable with respect to the angle metal 26. A screw 30 fixes the angle metals 26, 27 with respect to each other.

The end of the bar 13 is then by an angle metal 31 and a screw 32 connected to the vertical flange of the angle metal 27.

It will be clear that the deviation can be compensated now by adjusting the angle metal 27 until the bar 13 is exactly perpendicular to the saw blade 4. For parallel guiding the part 14b can remain parallel to the part 14a.

For other types of jig saw machines other auxiliary means can be developed.

If the jig saw machine is not provided with means for fixing a normal parallel saw guide, it is for instance possible to provide the auxiliary means with an auxiliary base plate, to be fixed below the normal base plate 1.

From FIGS. 7 and 8 it appears that auxiliary means for fixing the bar 13 make it possible that the same saw guide can also be used for circular sawing.

In this case the gauge member 14 is replaced by a cross member 33 forming part of a sliding member 15.

This sliding member 15 and thus the cross member 33 can be fixed on the bar 13 in each desired position by means of the clamp screw 16 (not shown in FIGS. 7 and 8).

In a slot 34 in the cross member 33 a pin 35 serving as the centre of the circle is adjusted and fixed in such a way that the distance from the pin 35 to the bar 13 is equal to the distance between saw blade 4 and bar 13. This can be obtained by the fixing means 36, which are provided with a sliding bearing in which pin 35 can rotate freely.

At the lower end of the pin 35 a transparent disc 37 is present resting on the panel 9 during sawing. The transparancy of this disc 37 facilitates finding the centre of the circle to be sawn, while the disc 37 is offering stability of the pin 35.

From FIG. 8 it appears that for sawing a circle the bar 13 must be arranged at a higher level, which is possible by turning the bar 13 including the angle piece 31 around the screw 32.

For sawing a circle the compensation for the deviation of the saw blade must be found at the connection between the bar 13 and the base plate 1.

I claim:
1. A saw guide for a power driven hand saw having a base plate providing a supporting surface for said saw as said saw moves along a member being cut, a saw blade extending through said base plate, a driving motor, and a handle with a motor switch, said saw guide comprising:
   a bar member attachable along a first end portion thereof to said base plate extending laterally to the longitudinal axis of said plate said bar member having a longitudinal linear scale along a top face thereof;
   a sliding member movable on said bar member and provided with an upwardly opening window having at least one indicator for aligning said sliding member along said scale;
   locking means on said sliding member for releasably locking said sliding member along said bar member;
   cutting guide means secured with said sliding member for bearing against a panel being cut with said saw to guide said saw along a desired cut as said saw is moved along said panel;
   and guide alignment compensating means connected with said bar member for adjusting the position and alignment of said cutting guide means relative to said saw blade for guiding said saw blade along a cutting line coincident with the plane of said saw blade; said compensating means including bracket means for adjustably securing said first end portion of said bar member with said base plate for adjusting the horizontal angle of said bar member relative to said base plate perpendicular to said saw blade.

2. A saw guide according to claim 1 wherein said bracket means comprises a first angle plate secured at a fixed position with said base plate, a second angle plate adjustably secured with said first angle plate for adjusting the horizontal angle of said second plate on said first plate, said first end portion of said bar being secured with said second angle plate.

3. A saw guide for a power driven hand saw having a base plate providing a supporting surface for said saw as said saw moves along a member being cut, a saw blade extending through said base plate, a driving motor, and a handle with a motor switch, said saw guide comprising:
- a bar member attachable along a first end portion thereof to said base plate extending laterally to the longitudinal axis of said plate said bar member having a longitudinal linear scale along a top face thereof;
- a sliding member movable on said bar member and provided with an upwardly opening window having at least one indicator for aligning said sliding member along said scale;
- locking means on said sliding member for releasably locking said sliding member along said bar member;
- cutting guide means secured with said sliding member for bearing against a panel being cut with said saw to guide said saw along a desired cut as said saw is moved along said panel;
- and guide alignment compensating means connected with said bar member for adjusting the position and alignment of said cutting guide means relative to said saw blade for guiding said saw blade along a cutting line coincident with the plane of said saw blade; said compensating means including bracket means for adjustably securing said first end portion of said bar member with said base plate for adjusting the horizontal angle of said bar member relative to said base plate perpendicular to said saw blade;
- said bracket means supports said bar member in spaced relation above said base plate and said cutting guide means comprises a cross member secured with said sliding member extending from said bar member on the same side as said base plate and a guide pin secured with said cross member extending downwardly for engaging a panel being cut to guide said hand saw in a circular cut.

4. A saw guide according to claim 3 wherein said cross member has a longitudinal slot and said pin is releasably secured with said cross member through said slot for adjusting the position of said pin along the length of said cross member.

5. A saw guide according to claim 4 wherein said pin is rotatable.

6. A saw guide in accordance with claim 1, wherein said sliding member has a plurality of indicators along said window for mitre sawing at different angles.

7. A saw guide in accordance with claim 6 wherein said cutting guide means has a gauging edge bevelled along a lower end edge.

8. A saw guide according to any one of claims 1, 2, 3, 4 or 5 wherein said bar member comprises a plurality of sections having a continuous scale thereon.

9. A saw guide in accordance with any one of claims 1, 2, 3, 4, 5, including a brace rod secured between a second free end of said bar member and said base plate at a location spaced from the connection of said bar member with said base plate, said brace rod lying in the plane of said bar member and having a portion thereof spaced from said bar member to permit said sliding member to move to the outward end of said scale on said bar member.

10. A saw guide according to claim 2 wherein said second angle plate has a first screw securing hole and spaced therefrom a second arc-shaped screw securing slot for adjusting the horizontal angle of said second angle plate on said first angle plate.

11. A saw guide for a power driven hand saw having a base plate providing a supporting surface for said saw as said saw moves along a member being cut, a saw blade extending through said base plate, a driving motor, and a handle with a motor switch, said saw guide comprising:
- a bar member attachable along a first end portion thereof to said base plate extending laterally to the longitudinal axis of said plate said bar member having a longitudinal linear scale along a top face thereof;
- a sliding member movable on said bar member and provided with an upwardly opening window having at least one indicator for aligning said member with said scale;
- locking means on said sliding member for releasably locking said member along said bar member;
- cutting guide means secured with said sliding member for bearing against a panel being cut with said saw to guide said saw along a desired cut as said saw is moved along said panel;
- guide alignment compensating means connected with said bar member for adjusting the position and alignment of said cutting guide means relative to said saw blade for guiding said saw blade along a cutting line coincident with the plane of said saw blade; and
- a brace rod secured between a second free end of said bar member and said base plate at a location spaced from the connection of said bar member with said base plate, said brace rod lying in the plane of said bar member and having a portion thereof spaced from said bar member to permit said sliding member to move to the outward end of said scale on said bar member.

* * * * *